UNITED STATES PATENT OFFICE.

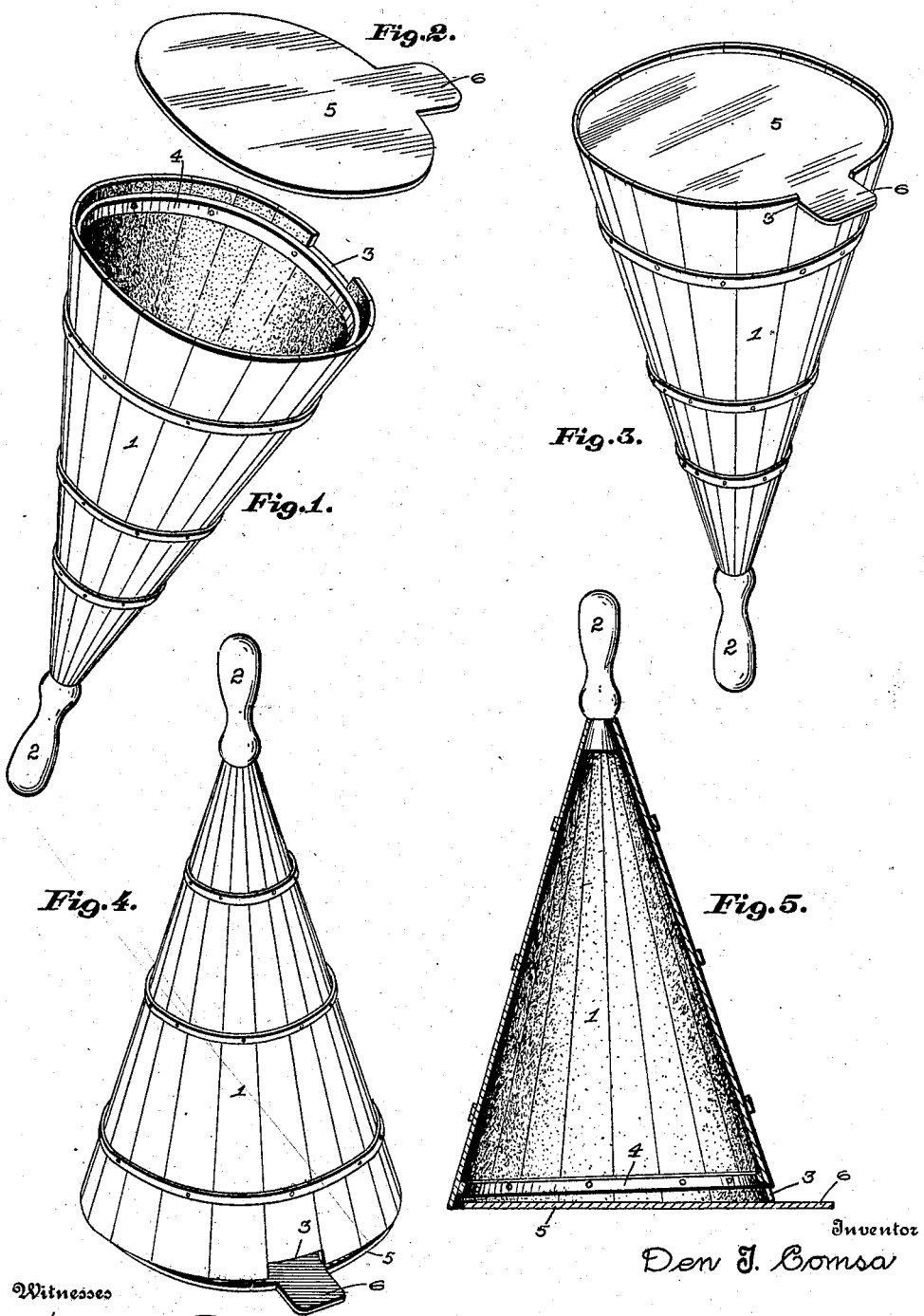

DEN I. COMSA, OF SALEM, OHIO.

SWARM-CATCHER.

No. 916,108.  Specification of Letters Patent.  Patented March 23, 1909.

Application filed June 11, 1908. Serial No. 437,822.

*To all whom it may concern:*

Be it known that I, DEN I. COMSA, a subject of the King of Roumania, residing at Salem, in the county of Columbiana and State of Ohio, have invented a new and useful Swarm-Catcher, of which the following is a specification.

My invention relates to improvements in swarm catchers to be used for the purpose of hiving swarms of bees, and the object of my invention is to provide a practical and cheaply constructed device, and one by the use of which a swarm of bees may be more completely captured than by the usual method. I attain this object by the device illustrated in the accompanying drawing, in which—

Figure 1 is a perspective view of the cone in position for taking the main portion of the swarm. Fig. 2 is a perspective view of the cover. Fig. 3 is a perspective view of the cone with the cover in position for keeping the bees within the catcher. Fig. 4 is a perspective view, showing the catcher in position to allow the entrance of bees. Fig. 5 is a section through the cone and cover in the position shown in Fig. 4.

Throughout the several views similar numerals refer to similar parts.

The numeral 1 indicates a hollow cone, preferably formed of wood, and with its inner surface somewhat roughened to allow the bees to maintain a better foothold thereon. The cone 1 is provided with the handle or grip 2 fixedly attached at the smaller end of the said cone whereby the said cone may be conveniently grasped for use. At the larger or open end of the cone the sides of the same terminate on a plane perpendicular to the axis of the cone and the opening 3 is provided. Around the inside of the cone is arranged the band 4 on a line with the upper edge of the opening 3.

The cover 5 is preferably of wood and of a size and contour to fit the inside of the end of the cone. The extension 6 is of the width of the opening 3 and when the cover is in place it rests upon the band 4, while the projection 6 extends through the opening 3 as shown in Fig. 3.

When the cone and cover are in the relative position shown in Fig. 4, it will be noted that the edge of the said cone is resting upon the said cover, the cone having been slightly lifted and pushed back with reference to the extension 5. In this position the opening 3 may be used as an entrance for bees.

In the use of the device the operator holding the cone by the handle 2 in one hand raises it in somewhat the position shown in Fig. 1 and moves it up until the open end of the cone surrounds or is directly below the bees. The swarm is then shaken from the limb of the tree or other object to which it is clinging whereupon it falls within the cone. The cover 5, held by the projection 6, is then put in place as shown in Fig. 3 thus inclosing the greater portion of the swarm. It will be understood that practically a large number of bees will have escaped capture by reason of the fact that they are flying at a distance from the swarm, and these wandering bees are usually lost in the other methods of hiving commonly employed, thus causing a loss in the production of honey by reason of the reduction of numbers.

When the swarm has been inclosed in the catcher as illustrated in Fig. 3, the said catcher is reversed with the larger end of the cone downward and in this position is placed upon the ground at a point beneath the place where the swarm had been located. The front or open edge of the cone is then slightly lifted and the cone moved back so that the said cone and the cover will assume the relative position shown in Fig. 4. In this position the catcher is allowed to stand until evening when the remaining bees of the swarm which it was impossible to inclose will find their way through the opening 3 into the interior of the cone. The operator may then replace the cover to the position shown in Fig. 3 and the entire swarm may thus be transported and placed within the hive desired.

It will be seen that the catcher herein described may be cheaply and easily manufactured and that by its use swarms of bees may be hived in the most satisfactory and natural manner thus accomplishing the particular object of my invention.

I claim:—

1. The herein described swarm catcher comprising a hollow cone provided with a side opening at its larger end, a band located on the inside of the cone on a line with the upper edge of said side opening and a cover adapted to be placed inside of the larger end of the cone and provided with an extension adapted to extend through the said side opening.

2. The herein described swarm catcher comprising a hollow cone with a side opening at its larger end and a cover adapted to be placed inside of the larger end of the cone and provided with an extension adapted to extend through the said side opening.

3. In a swarm catcher, a hollow cone provided with a side opening, a cover adapted to close the cone, said cover having a projection extending through said opening and the said cone and cover adapted to be placed in a position whereby the said opening will permit the entrance of bees through said side opening.

4. In a swarm catcher, a hollow cone provided with a handle at its smaller end and a side opening at its larger end, and a cover adapted to close the said opening and larger end.

5. A swarm catcher of the character described, comprising a hollow cone and a cover adapted to close the larger end of said cone and means for providing an opening between said cover and cone, substantially as and for the purpose specified.

In testimony that I claim the above, I have hereunto subscribed my name in the presence of two witnesses.

DEN I. COMSA.

Witnesses:
R. C. KRIDLER,
A. H. LEFKOVITS.